April 6, 1937. M. CYGANICK 2,076,120
GARDEN TOOL
Filed May 31, 1934
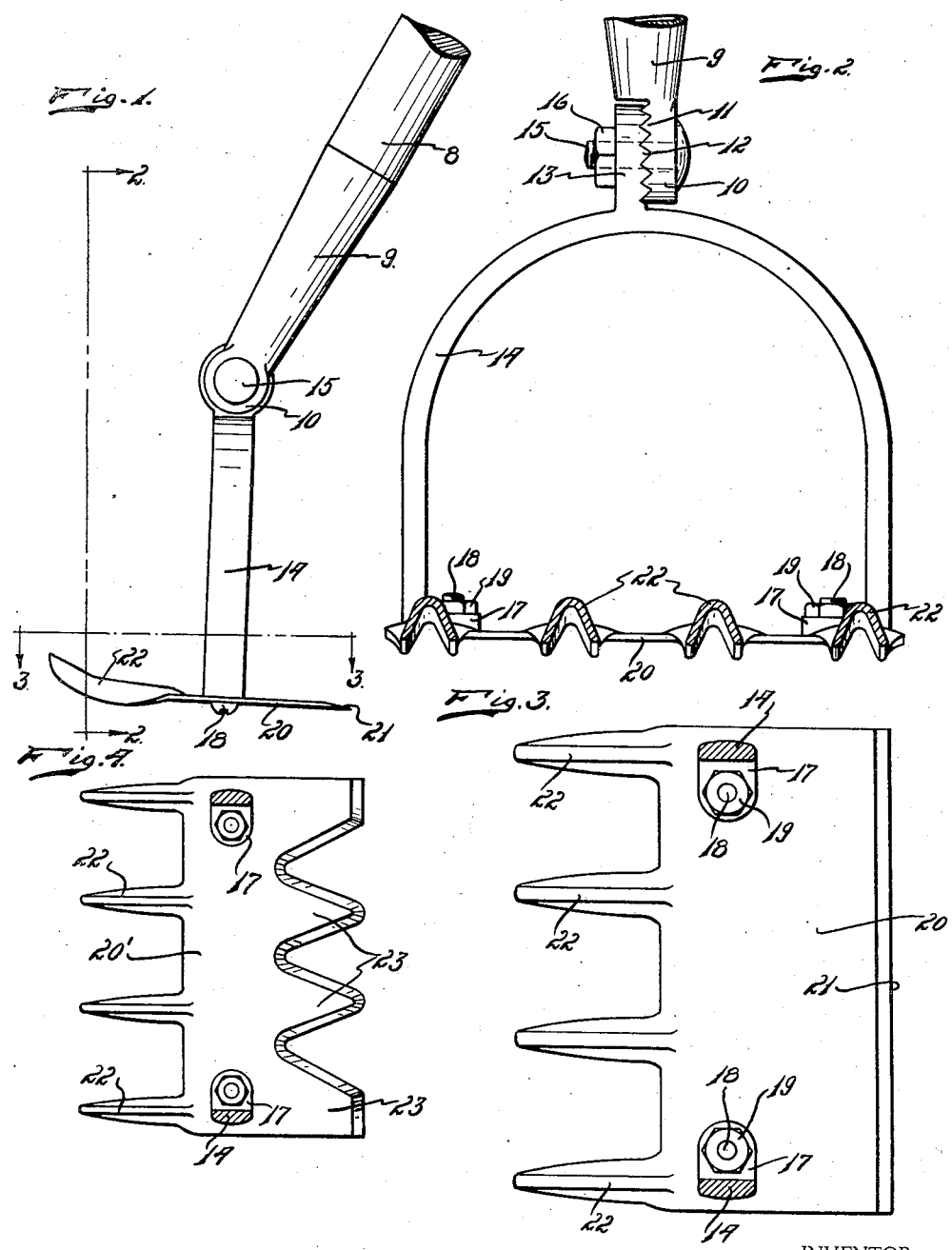
INVENTOR.
MARY CYGANICK
BY
Thos. S. Donnell
ATTORNEY.

Patented Apr. 6, 1937

2,076,120

UNITED STATES PATENT OFFICE 2,076,120

GARDEN TOOL

Mary Cyganick, Marine City, Mich.

Application May 31, 1934, Serial No. 728,326

1 Claim. (Cl. 97—66)

My invention relates to a new and useful improvement in a garden tool and has for its object the provision of a garden tool which may be utilized for cultivating, rooting out weeds, and general tilling purposes and which is so constructed and arranged that when used for cultivating or rooting out weeds, the weeds and roots will be gathered by two portions of the tool which will also serve as a separator for loosening the soil and separating the weeds therefrom.

Another object of the invention is the provision of a tool of this class which may be adjusted so that it is adapted for various uses and purposes.

Another object of the invention is a provision of a tool which, while being adapted for use in tilling or rooting out weeds, may also be used as a rake for gathering in weeds or loosened roots and break up the loosened soil.

Another object of the invention is the provision of a device which will reduce to a minimum the necessary labor for tilling and general hoeing purposes.

Another object of the invention is the provision of a device which may be simple in structure, economical of manufacture, durable, highly efficient in use, and light.

Other objects will appear hereinafter.

The invention consists in the combination and arrangement of parts hereinafter described and claimed.

The invention will be best understood by a reference to the accompanying drawing which forms a part of this specification and in which, Fig. 1 is a side elevational view of the invention.

Fig. 2 is a view taken on line 2—2 of Fig. 1.

Fig. 3 is a view taken on line 3—3 of Fig. 1.

Fig. 4 is a view similar to Fig. 3 showing a modified type of blade.

As shown in the drawing the invention comprises a handle 8 secured to a metallic socket 9 which carries a head 10 having the teeth 11 formed on one face and adapted to interengage with the teeth 12 formed on the head 13 carried by the yoke 14. A bolt 15 and nut 16 serve to bind these parts together. From the method of attaching the handle to the yoke, it is obvious that the handle may be tilted to various angles relatively to the yoke and secured in these various positions of tilt.

Each leg of yoke is provided with the angularly turned portion 17 through which a bolt 18 may be projected and on which is threaded a nut 19 to secure the blade 20 in position. This blade 20 is provided at one side with the straight sharpened cutting edge 21 and at the opposite side with the teeth 22 which curve upwardly as shown in Fig. 1 and Fig. 2, and which are formed channel shaped as clearly appears in Fig. 2.

In use when the handle 8 is tilted to the angle shown in Fig. 1 and the blade 20 mounted thereon, the blade 20 with a minimum effort may be drawn forwardly beneath the surface of the earth to effect a loosening of the same and a cutting out of weeds, roots, etc. As the tool is drawn forwardly, the loosened earth will slide rearwardly over the upwardly inclined teeth which will serve to break up the earth and loosen the weeds and roots therefrom, these weeds and roots adhering or lying in position on the teeth until the separation desired is had. It is obvious that after a portion of the soil has been so loosened the tool may be inverted and the teeth 22 used as a rake. On account of the inclination of the handle these teeth will, when the operator is holding the handle in the normal position, extend substantially vertically to the earth and serve as an effective rake.

In Fig. 4 I have shown a modified form of blade 20' in which the straight edge 21 is replaced by sharpened teeth 23.

While I have shown the blades of substantially the same width as the yoke 14 it is obvious that these blades may be formed of greater width and extended on either side, thus affording a tool which will cultivate a maximum area in a single operation.

While I have illustrated and described the preferred form of my invention, I do not wish to limit myself to the precise details of structure shown but desire to avail myself of such variations and modifications as may come within the scope of the appended claim.

Having thus described my invention what I claim is new and desire to secure by Letters Patent is:

In a garden tool of the class described, a blade having one edge sharpened to provide a cutting surface; and spaced channel-shaped teeth projecting outwardly from the opposite edge of said blade, said teeth being curved upwardly on an arc struck from a center above said blade, said teeth opening downwardly.

MARY CYGANICK.